Patented Sept. 27, 1932

1,879,209

UNITED STATES PATENT OFFICE

HERMANN HAGENEST, OF LEVERKUSEN-WIESDORF-ON-THE-RHINE, AND FRIEDRICH WILHELM STAUF, OF COLOGNE-DEUTZ-ON-THE-RHINE, GERMANY, ASSIGNORS TO GENERAL ANILINE WORKS, INC., OF NEW YORK, N. Y., A CORPORATION OF DELAWARE

PROCESS OF PREPARING NITRILES

No Drawing. Original application filed October 30, 1929, Serial No. 403,652, and in Germany November 7, 1928. Divided and this application filed September 16, 1930. Serial No. 482,369.

The present invention relates to a process of preparing nitriles by reacting upon an aromatic diazo compound with an alkali-metal-cupri-alkalino-cyanide.

The compounds used for converting aromatic diazo compounds into nitriles correspond probably to the general formula:

$$Alk_x Cu(CN)_y . A_z$$

wherein Alk means an alkali metal, A stands for an alkali metal or ammonia, $x$ stands for 2 and $y$ for 4, or $x$ stands for 3 and $y$ for 5 and $z$ stands for 1 or 2.

These compounds are prepared by reacting with a water soluble copper salt upon ammonia or an alkali metal hydroxide in the molecular quantities indicated by the above formula and by adding to the mixture obtained the respective quantity of a water soluble cyanide at a temperature of between about 0 and 20° C.

The new compounds are stable only in aqueous solution and decompose while splitting off cyanogen when the solution is evaporated even when working in vacuo. The weakly yellow colored aqueous solutions however are stable even at temperatures up to 100° C.

According to the present invention nitriles are prepared from aromatic diazo compounds by heating a diazo-compound with the solution of an alkalimetal-cupri-alkalino-cyanide to about 40–100° C.

Heretofore aromatic nitriles have been prepared by heating a solution of the respective diazo compound with a solution of potassium cupro cyanide of the formula $K_2CuCN_3$ to about 75–85° C (compare Gattermann, Die Praxis des organischen Chemikers, 20. Aufl. 1927, page 262). We have found that about half the quantity of copper salt and also half the quantity of cyanogen can be saved by using our new cupri salts as nitrilization means.

According to the old process for every mol of the diazo compound 3 mols of potassium cupro cyanide are used, according to the equation:

$$CuSO_4 + 2KCN = CuCN + K_2SO_4 + \tfrac{1}{2}(CN)_2,$$
$$CuCN + 2KCN = K_2Cu(CN)_3,$$
$$K_2Cu(CN)_3 + C_6H_5N_2Cl = C_6H_5CN + N_2 + KCl + KCN.CuCN$$

while when using one of our new compounds, for instance, $$Na_3Cu(CN)_5.(NH_3)$$

only 5/3 mols of the salt are used according to the equation:

$$K_3Cu(CN)_5.NH_3 + 3C_6H_5N_2Cl = 3KCl + 3C_6H_5CN + \tfrac{1}{2}(CN)_2 + CuCN + NH_3 + 3N_2$$

Our invention is illustrated by the following examples without being limited thereto:

*Example 1.*—21,4 parts by weight of p-toluidine are diazotized in an ice cold hydrochloric acid solution with 14 parts by weight of sodium nitrite according to usual methods and introduced into a solution of a potassium-cupri-monammine-cyanide, obtainable by dissolving 25 parts by weight of crystallized copper sulfate in 100 parts by weight of water and introducing this solution into a solution consisting of 26 parts by weight of potassium cyanide of 100%, dissolved in 50 parts by weight of water and 17,25 parts by weight of watery ammonia of 10%. The p-tolunitrile thus obtained is distilled off by steam distillation and rectified in the usual manner.

Yield: 19,5 parts by weight=83,4%.

*Example 2.*—18,6 parts by weight of aniline are diazotized in an ice cold hydrochloric acid solution with 14 parts by weight of sodium nitrite according to usual methods and introduced into a solution of a potassium-cupri-diamine-cyanide, obtainable by dissolving 25 parts by weight of crystallized copper sulfate in 100 parts by weight of water and introducing the solution into a solution consisting of 26 parts by weight of potassium-cyanide of 100%, dissolved in 50 parts by weight of water and 34,5 parts by weight of ammonia of 10%. The benzonitrile thus obtained is distilled off by steam distillation and rectified in the usual manner.

Yield: 13,4 parts by weight=65%.

*Example 3.*—32,1 parts by weight of p-toluidine are diazotized in an ice cold hydrochloric acid solution with 21 parts by weight of sodium nitrite according to usual methods and introduced into a solution of a sodium-monammine-cupri-cyanide, obtainable by dissolving 25 parts by weight of crystallized copper sulfate in 100 parts by weight of water and introducing this solution into a solution of 24,5 parts by weight of sodium cyanide of 100%, dissolved in 50 parts by weight of water and 17,25 parts by weight of ammonia of 10%. The p-tolunitrile thus obtained is distilled off by steam distillation and rectified in the usual manner.

Yield: 29,25 parts by weight=83,4%.

*Example 4.*—32,1 parts by weight of p-toluidine are diazotized in an an ice cold hydrochloric acid solution with 21 parts by weight of sodium nitrite according to usual methods and introduced into a solution of a sodium-diamine-cupri-cyanide, obtainable by introducing 4 parts by weight of sodium hydroxide in 20 parts by weight of water into an aqueous solution of 25 parts by weight of crystallized copper sulfate, dissolving the precipitate, thus formed, in a solution of 24,5 parts by weight of a 100% sodium cyanide in 50 parts by weight of water. The p-tolunitrile thus obtained is distilled off by steam distillation rectified in the usual manner.

Yield: 29,25 parts by weight=83,4%.

The present application is a division of our copending application Ser. No. 403,652 filed 30th October 1929.

We claim:

1. In the process for preparing a nitrile the step which comprises reacting with a compound of the probable general formula:

$$Alk_x\text{-}Cu(CN)_y.A_z$$

wherein Alk means an alkali metal, A stands for an alkali metal or ammonia, $x$ stands for 2 and $y$ for 4, or $x$ stands for 3 and $y$ for 5 and $z$ stands for 1 or 2, upon an aromatic diazo compound while heating between about 40° and 100° C.

2. In the process for preparing a nitrile the step which comprises reacting with a watery solution of a compound of the probable formula:

$$Na_2Cu(CN)_4.2NH_3$$

upon an aromatic diazo compound while heating between about 40 and 100° C.

3. In the process for preparing a nitrile, the step which comprises reacting with a watery solution of a compound of the probable formula:

$$K_2Cu(CN)_4.NH_3$$

upon an aromatic diazo compound while heating between about 40 and 100° C.

4. In the process for preparing a nitrile, the step which comprises reacting with a watery solution of a compound of the probable formula:

$$K_3Cu(CN)_5.NH_3$$

upon an aromatic diazo compound while heating between about 40 and 100° C.

In testimony whereof we have signed at the City of Cologne this 3rd day of September 1930.

HERMANN HAGENEST.
FRIEDRICH WILHELM STAUF.